United States Patent Office 3,743,530
Patented July 3, 1973

3,743,530
METHOD OF PRODUCING SHEET MATERIAL HAVING MICRO-POROUS STRUCTURE
Saburo Oohara, Kyoto, and Masahiro Takeuchi, Kasai, Japan, assignors to Kanegafuchi Boseki Kabushiki Kaisha, Tokyo, Japan
No Drawing. Filed July 13, 1970, Ser. No. 54,584
Claims priority, application Japan, July 19, 1969, 44/57,192
Int. Cl. D06n 3/04
U.S. Cl. 117—63  6 Claims

ABSTRACT OF THE DISCLOSURE

A tough and soft polyurethane film having a high moisture permeability and a uniform microporous structure is prepared by coating a base material with a water-miscible organic solvent solution of a synthetic polymer containing polyurethane, said solution also containing from 5–90% by weight of thiourea based on the weight of the polymer. The coated base material is then treated with an aqueous coagulating solution of an inorganic salt to coagulate the polymer and then washing and drying same.

This invention relates to an improved method of making a tough and soft polyurethane sheet material high in the moisture-permeability and having a uniform microporous structure.

More particularly the present invention relates to a method of making a tough and soft polyurethane sheet material high in the moisture-permeability and having a uniform microporous structure characterized by applying a water-miscible solvent solution of a film forming polymer consisting of or mainly of a polyurethane and containing thiourea onto a base material, treating the coated base material with an aqueous solution containing an inorganic salt selected from the group consisting of sodium chloride, potassium chloride, aluminum chloride, ammonium chloride, sodium sulfate, potassium sulfate, aluminum sulfate and ammonium sulfate and containing or not containing thiourea, to coagulate the polymer, and then washing and drying the same.

When a layer of an organic solvent solution of film forming polymer consisting of or mainly consisting of polyurethane is dipped in water, the surface of the layer in contact with water will be quickly coagulated to form a compact or dense structure. However, the coagulation of the interior of the polyurethane layer will be delayed. Thus, large voids will be likely to be formed in said interior, while the surface will be so compact or dense that it will be difficult to obtain uniform microporous structure throughout the layer. The resulting sheet material is poor in gas-permeability as a whole and is not satisfactory as a synthetic leather surface layer.

In this respect, it has already been described in British Pat. No. 981,642 (Belgian Pat. No. 626,816) that when a polyurethane solution is merely coagulated in water, a moisture-permeable uniform microporous film desirable as a synthetic leather surface layer will not be obtained unless one of the following additional measures is taken:

(a) Exposing the layer of the polymer solution to a moistened atmosphere of a controlled relative humidity for a certain period of time before the layer is immersed in water;

(b) Adding to the polymer solution water or any other non-solvent for the polymer in an amount carefully adjusted to convert said polymer solution to a colloid dispersion but not to cause gelling;

(c) Adding and mixing water or any other non-solvent for the polymer into the polymer solution so that the mixture is separated into a gel part and a liquid part, then using the gel part for coating.

The above mentioned process (a) is described in detail in British Pat. No. 849,155. However, there are disadvantages that a strictly controlled atmosphere is required and that a long time is required for the coagulation of a coating film of any thickness. Further, not only the relative humidity but also the temperature must be controlled and it is not easy, in industrial practice, to control the atmosphere to obtain homogeneous and uniform microporous films. Further, in such moisture-controlled atmosphere, it takes more than several hours to well moisten and coagulate a layer (0.6 mm.), for example, a dimethyl formamide solution containing 20% polyurethane. It is also difficult to determine the proper degree of coagulation.

The above mentioned process (b) is described in detail, for example, in Belgian Pat. No. 624,250. A considerably good microporous sheet is obtained by this process. However, in preparing the so-called colloid dispersion just before the substantial gelling of said polymer solution, the resulting colloid dispersion will be greatly influenced by the concentration and tempearture of said polymer solution to be used, the amount of the non-solvent to be added thereto and the method of the addition of the non-solvent, so that it will be necessary to very carefully adjust and control the optimum conditions. Therefore, it is difficult to industrially practice said process.

The process (c) is disclosed for example in Belgian Pat. No. 624,250. However, the step of separating the gel is complicated, and the control and adjustment of the proper concentration and viscosity of the gel are difficult.

Further, in the cases of the above mentioned processes (b) and (c), the strength of the resulting microporous film will tend to reduce.

There has already been proposed a method of making a sheet or film high in the moisture-permeability and having a microporous structure by applying a water-miscible solvent solution of a polymer consisting of or mainly consisting of a polyurethane onto a base material, coagulating the coated material in an aqueous solution of a water-soluble inorganic salt, and then washing and drying. There has been also already proposed a method of making a sheet or film higher in the moisture-permeability and having a microporous structure by applying a solution containing a polurethane and urea onto a base material, coagulating the coated material in an aqueous solution of a certain water-soluble inorganic salt, and then washing and drying.

These methods, have been successful in simplifying the operation as compared with the above described conventional processes (a) to (c) and at the same time in producing a film high in the moisture-permeability and having a microporous structure. However, in the above improved methods, there has been encountered a problem in the mass-production of microporous film or sheet.

Thus in the continuous mass-production system, there is a time period of several minutes (though different depending on the particular apparatus) between the application of the coating polymer solution on the base material and the immersion of the coated material in the coagulating bath. Therefore, the applied solution layer will be exposed to the atmosphere during this time period and will therefore absorb moisture in the air. This moisture absorption will have a bad influence on the coagulation in the coagulating bath and cause the formation of undesirable macropores in the coagulated layer. This tendency is remarkable particularly when the atmospheric humidity is higher than 45% in relative humidity.

However, it is very difficult to control the humidity in response to the daily changing meteorological conditions or particularly to keep the humidity sufficiently low. Further it is almost impossible to eliminate the time period between the coating step and the subsequent immersion step.

Therefore the primary object of the present invention is to provide an improved method of making a moisture-permeable film or sheet material having uniform micropores but no macropores.

Another object of this invention is to provide an economically advantageous method of making a sheet material which comprises a microporous film supported on a fibrous or other porous base material and which is not inferior to natural leather in respect of its durability, appearance and toughness.

Other objects of this invention will become apparent from the following description.

We have now found that, according to this invention, the above drawbacks are overcome and there can be obtained a tough and soft sheet which is high in the moisture-permeability and has uniform microporous structure. Even if the coating solution layer is exposed to the atmosphere under any temperature and humidity conditions no macropores will be formed in the resulting solidified sheet material.

According to this invention, there is used a coating polymer solution prepared by adding thiourea to a water-miscible solvent solution of a polymer consisting of or consisting of a polyurethane. The coating solution is applied onto one or both surfaces of a synthetic leather base material or a film making plate or sheet so as to be in the form of a film, and then the coated material is treated with an aqueous solution containing an inorganic salt selected from the group consisting of sodium chloride, aluminum chloride, potassium chloride, ammonium chloride, sodium sulfate, potassium sulfate, aluminum sulfate and ammonium sulfate or an aqueous solution containing said inorganic salt and thiourea to coagulate the coated polymer layer. Then the material is washed with water and dried.

The advantages of the present invention are as follows:

(1) Since the coating polymer solution contains thiourea, it can be easily and uniformly applied to the base material without any trouble, and the coated material can be immediately and continuously immersed in a coagulating and regenerating bath (which is referred to as a coagulating bath hereinafter) consisting of the above mentioned aqueous solution. Further, even if the time interval between the coating and immersion into the coagulat- bath is long and even if the humidity of the atmosphere is not controlled, the coated material will not be adversely affected by water or moisture in the atmosphere. The coagulating characteristics of the polyurethane are remarkably improved.

(2) In the coagulating step, due to the synergistic effect of the thiourea in the coating solution and said inorganic salt in the aqueous coagulating bath, the coagulating velocity of the polymer solution layer is controlled so that the difference between the coagulating velocity on the surface of the polymer solution layer and the coagulating velocity in the interior of the layer is reduced and further the coagulation is caused quickly and uniformly throughout the coating solution layer. Therefore, there can be formed a solidified or coagulated film having a uniform microporous structure without causing shrinking or deformation thereof. The remaining solvent can be easily washed and extracted away from the coagulated layer. The inorganic salt, thiourea and the solvent can be easily removed in the subsequent washing step.

(3) There can be easily produced a tough and soft microporous film or synthetic leather sheet higher in the moisture-permeability than conventional ones.

(4) There is required no special apparatus before the coagulating bath. The operation is simple. The inorganic salt and thiourea to be used are both inexpensive and readily available.

The synthetic leather base material to be used in the method of the present invention is a textile sheet like material such as woven fabric, knit fabric, nonwoven fabric, felt or flannel consisting of such fibers as natural fibers, synthetic fibers or semi-synthetic fibers. It is also possible to use a sponge sheet or paper sheet as the base material. If desired, the base sheet material may be impregnated with a solution or emulsion of a synthetic polymer or pretreated with a latex of a natural rubber or synthetic rubber.

The polymer coating solution may also be applied to a solid sheet or plate such as of glass, metal or plastic.

The coating polymer solution is a water-miscible solvent solution of a polymer consisting of or consisting of a polyurethane. According to this invention, it is essential that this coating solution contains thiourea. The coating solution may also contain a coloring agent (such as dye or pigment), stabilizing agent or reinforcing agent (such as fibers, asbestos, calcium carbonate or fine powdered silica).

In carrying out the present invention, any of conventional film forming polyurethanes which are well known in the art may be used. Generally, for the production of such polyurethane, a prepolymer is prepared by reacting an organic diisocyanate compound with a polyalkylene ether glycol or polyester having terminal hydroxyl groups. The prepolymer is then chain-extended with a chain extender having reactive hydrogen atoms such as diamine, diol or polyol to form a polyurethane elastomer.

The organic diisocyanate may be an aromatic, aliphatic or alicyclic diisocyanate or a mixture of them such as, for example, toluylene-2,4-diisocyanate, toluylene-2,6-diisocyanate, diphenyl methane-4,4'-diisocyanate, 1,5-naphthylene diisocyanate, hexamethylene diisocyanate or paraxylene diisocyanate.

The polyalkylene ether glycol is, for example, polyethylene ether glycol, polypropylene ether glycol, polytetramethylene ether glycol or polyhexamethylene ether glycol or a copolymer or mixture of them.

The polyester which may be used is a polycondensate of an organic acid and a glycol. Preferable glycol is such polyalkylene glycol as ethylene glycol, propylene glycol, tetramethylene glycol or hexamethylene glycol, such cyclic glycol as cyclohexane diol or such aromatic glycol as xylylene glycol. Further, the acid to be used may be succinic acid, adipic acid, sebacic acid or terephthalic acid.

For the chain extender, there may be used such diamine as, for example, hydrazine, ethylene diamine, methylene diorthochloraniline.

If desired, a catalyst such as triethylamine, triethylene diamine, N-ethyl morpholine, dibutyl tin dilaurate or cobalt naphthenate may be used in preparing the polyurethane elastomer.

In the present invention, the polyurethane is used as a solution. The solvent for the polymer must be selected from those which are miscible with water and are able to be extracted with an aqueous solution of the inorganic salt (and thiourea). Therefore, water-miscible solvents are suitable. Examples of these solvents are any one or a mixture of any of N,N'-dimethyl formamide, dimethyl sulfoxide, tetrahydro furan, tetramethyl urea, N,N'-dimethyl acetamide, dioxane or butyl carbinol. Further, any of ketones which alone are not good solvents for the polyurethane but are well miscible with the solution, such as acetone and methyl ethyl ketone can be used as a diluent in so far as they do not coagulate soil polymer.

If desired, a small amount of one or more of other film forming polymers soluble in the solvent, such as vinyl homopolymer, for example, vinyl chloride, polyvinyl alcohol, polyacrylonitrile, polyacrylic ester or polyacrylic acid or copolymers of them may be added to the above mentioned polyurethane solution. The amount of such other polymer may be 2 to 40% by weight based on the polyurethane.

It is possible to add a coloring agent (such as a dye or pigment), light stabilizing agent or reinforcing agent (such as talc, calcium carbonate or fine powdered silicic acid) to the polymer solution.

The concentration of the polymer in the polymer solution may be in a range of 10 to 40%, preferably 15 to 35% by weight.

The most important additive to be added and contained in the coating solution is thiourea. The proper amount of thiourea is in a range of 5 to 90% by weight, preferably 20 to 70% by weight, more preferably 30 to 60% by weight based on the weight of the polyurethane in the coating solution. If the amount of thiourea is more than 90% by weight, the polymer will gel with the thiourea, while if it is less than 5% by weight, the difference in coagulating speed between the surface and the interior of the coating solution layer becomes large so that the production of a film having a uniform microporous structure becomes difficult.

When thiourea is added to and contained in the polymer solution, the coagulating characteristics are remarkably improved. Thus, even if the time interval between the application of the coating solution and immersion of the coated material in the coagulating bath is long, irrespective of the humidity condition of the atmosphere, the moisture in the atmosphere would not cause an adverse affect to the coated polymer solution layer, and even if the humidity is not controlled a film high in the moisture-permeability and having a uniform microporous structure can be formed. Due to the synergistic effect of the thiourea in the coating solution and the inorganic salt (and thiourea) in the aqueous coagulating solution, the coagulating velocity of the coated layer of the polymer solution is controlled, the difference between the coagulating velocity on the surface of the coated layer and the coagulating velocity in the interior of the coated layer becomes small so that the coating solution layer is coagulated uniformly at both the inside portion and the surface portion and a film having a uniform microporous structure is quickly formed. Further, even if a comparatively large amount of thiourea is added and contained in the coating polymer solution, the coating solution is stable and further, due to the dissolution and removal of thiourea remaining in the coagulated film in the subsequent washing step, micropores are further additionally formed in the coagulated film to increase the porosity. As compared with a coating solution containing urea, a coating solution containing thiourea according to this invention forms, upon coagulation, a film with smaller micropores and higher moisture-permeability.

The polymer solution is adjusted to be of such viscosity as can be easily applied to the surface of a base material. Generally a viscosity of about 20,000 to 200,000 centipoises is preferable.

The polymer solution (coating solution) is coated or applied onto one or both surfaces of a base material for a synthetic leather, such as a woven, knitted or nonwoven fabric, sponge or paper. It is also possible to apply the polymer solution on such a solid sheet or plate as glass, metal or plastic.

The coating may be conducted in any known manner such as by knife coating, roller coating or spraying. Since the polymer solution is homogeneous or uniform, it may easily be applied on said base material and there will be no such disadvantage as in the method described in Belgian Pat. No. 624,250.

For the coagulating bath, it is desirable to feed water at a proper velocity to the polymer solution layer and to cause a coagulation as uniform as possible inward from the outer surface of the layer so that a microporous structure may be formed. For that purpose, it is necessary that, while the penetration and diffusion of water into said polymer solution layer from the coagulating bath and the desolventing into the coagulating bath out of said polymer solution layer occur simultaneously, the respective velocities should keep a proper ratio. That is to say, unless the coagulating velocity is higher than the desolventing velocity, no uniform microporous structure will be formed but supermacropores will be partially produced and numerous macropores will be produced just below the surface layer. It has been found that when a proper substance (additive) to adjust the penetrating velocity (or coagulating velocity) of water from the coagulating bath and the desolventing velocity from the polymer solution layer is present in the coagulating bath, a satisfactory coagulation can be accomplished.

We have found that, in case an aqueous solution containing the before mentioned inorganic salt or an aqueous solution containing the inorganic salt and thiourea is used for the coagulating bath, there is obtained a synergistic effect of such inorganic salt and the thiourea in the coating solution so that the coagulating velocity of the coating solution is controlled. Thus the difference between the coagulating velocity at the surface portion of the coating solution layer and the coagulating velocity in the interior of the coating solution layer becomes small, the coating solution layer is uniformly coagulated at both the inside portion and the surface portion and a film high in the moisture-permeability and having a uniform microporous structure is quickly formed.

The inorganic salt to be added in the coagulating bath is sodium chloride, potassium chloride, aluminum chloride, ammonium chloride, sodium sulfate, potassium sulfate, aluminum sulfate or ammonium sulfate. The proper concentration of the salt in the coagulating bath is somewhat different depending on the particular polyurethane solution, the amount of addition of thiourea and the kind of the other additive but is generally 50–450 grams per liter. Preferable concentrations are as follows:

| Salt | General concentration range (g./l.) | Preferable concentration range (g./l.) |
| --- | --- | --- |
| Sodium sulfate | 50–330 | 200–300 |
| Potassium sulfate | 50–300 | 200–300 |
| Sodium chloride | 50–300 | 150–300 |
| Potassium chloride | 100–300 | 150–300 |
| Aluminum chloride | 150–450 | 150–300 |
| Ammonium chloride | 100–250 | 150–200 |
| Aluminum sulfate | 100–200 | 150–200 |
| Ammonium sulfate | 100–350 | 150–300 |

In case the content of said inorganic salt in the coagulating bath is lower than the lower limit of the above mentioned range, the difference in coagulating velocity between the surface portion and inner portion of the coating solution layer becomes large so that the production of a film having a uniform microporous structure becomes difficult. When the amount of the salt is higher than the upper limit mentioned above, the formation of a film having uniform micropores tends to become difficult and at the time salts are likely to be precipitated.

The range of the amount of said inorganic salt in the coagulating bath of the present invention is comparatively wide. Even in a comparatively low concentration range, such excellent coagulating effect as is described above can be obtained.

Sometimes, the coagulating bath may further contain thiourea. The proper concentration of thiourea to be contained in the coagulating bath is somewhat different depending on the kind and concentration of said inorganic salt to be present in the coagulating bath but generally is in a range of 0 to 150 g./l., preferably 0 to 100 g./l. and more preferably 2 to 70 g./l. In case it is higher than 150 g./l., the concentration of the water miscible solvent (for example, N,N'-dimethyl formamide) near the surface of the coating solution layer will become high and the solubility of said inorganic salt will reduce remarkably so that the salt will be crystallized on the surface and will be likely to hurt irregularly the surface of the porous film.

The temperature of the coagulating bath is in the range of 30 to 60° C., preferably 40 to 55° C. In case it is lower than 30° C., the crystals of the inorganic salt will be likely to be precipitated and the microporous film surface will be hurt by the crystals. When it is higher than 60° C., the operation will become difficult and moisture-permeability of the resulting film will reduce.

According to the present invention, the resulting films have always uniform microporous structure and no macropores, even if the composition and temperature of the coagulating bath are fixed to be constant and there is a change in meteorological conditions.

After the coagulation, the film is washed with water to remove the water-miscible organic solvent, inorganic salt and thiourea remaining in said film, and is then dried under the normal conditions. Since the film is uniformly coagulated and has uniform microporous structure it is easy to wash away or remove such organic solvent, inorganic salt and thiourea. Therefore there is no danger that the film is adversely affected by any remaining solvent in the drying step.

When the polymer solution is applied onto one or both surfaces of such sheet or plate as glass, metal or plastic, the resulting microporous film thereon may be peeled off the base sheet or plate. When the polymer solution is applied onto one or both surfaces of a base material suitable for a synthetic leather such as a woven or nonwoven fabric, film, sponge or paper or the like, the resulting microporous film will be bonded firmly on said base material. The material thus obtained is useful as a synthetic leather.

The microporous film may be finish-coated with an ordinary paint or lacquer for leathers, without adversely affecting the desirable property and performance of the product.

The invention will be explained in more detail with reference to the following examples in which all parts are by weight. In these examples the breaking strength, elongation, moisture-permeability, bending strength and presence of macropores in the resulting films were determined as follows:

(1) Breaking strength and elongation: These were measured in respect of a sample of a width of 2 cm. and a holding length of 5 cm. at a pulling velocity of 3 cm./minute with an Instron Tester.

(2) Moisture-permeability: The amount of weight increase of calcium chloride through a predetermined area of the sample film in an atmosphere of a relative humidity of 80% at 30° C. was measured and the moisture-permeability was represented by an amount of weight increase (mg.) per unit time (hour) per unit area (cm.$^2$), i.e. mg./hr./cm.$^2$. The larger this value, the higher the moisture-permeability.

(3) Bending strength: This was measured with Flexi-O-Meter (made by Yasuda Precise Machine Manufactory, Ltd., Japan).

(4) Presence of macropores: The cut surface of the film was microscopically observed. Also two-fold surface of the film was scraped with a razor and the cut-exposed face was observed with a microscope to determine whether there existed macropores (10 microns or larger in average diameter).

EXAMPLE 1

105 parts of polyethylene adipate of an average molecule weight of 1100 having terminal —OH groups were dissolved in 200 parts of anhydrous dioxane, and 400 parts of methylene bis(4-phenyl isocyanate) were added thereto. The solution was kept in a nitrogen gas current at 80° C. for 2 hours and was then cooled to 30° C. To the resulting solution of the prepolymer having terminal —NCO groups, were added 3.7 parts of ethylene glycol and 0.02 part of triethylene diamine together with 100 parts of anhydrous dioxane to conduct a chain-extending reaction for 3 hours. Then the polymer solution was cooled and poured into water to remove the greater part of the dioxane. The polymer was recovered and then dried at 80° C. Under a reduced pressure. The polymer was dissolved in N,N′-dimethyl formamide so as to be of a concentration of 30% by weight. The viscosity of said polymer solution was 45,100 centipoises at 30° C.

This polyurethane solution with the addition of each of 3, 5, 10, 15, 20, 30, 40, 50, 60, 70, 80, 90 and 100% thiourea on the weight of the polyurethane was used as a coating solution. The coating solution was applied to be of a thickness of about 1.0 mm. onto a glass plate. The coated glass plate was then left for 5 minutes in an atmosphere of a relative humidity of 80% at 25° C. and was then immersed in an aqueous solution containing 200 g./l. of sodium sulfate at 40° C. for 10 minutes.

Then the glass plate with a coagulated film thereon was dipped into a hot water bath at 50° C. for washing. The film was peeled off the glass plate, was washed with hot water for 30 minutes to be well desolvented and was air-dried at 100° C. for 30 minutes. The properties of the thus obtained films were as shown in Table 1.

Also, for comparisons, the same procedure was repeated except that no thiourea was added to the coating solution, and the same procedure was repeated except that 50% urea based on the polyurethane was added instead of thiourea. The results are also indicated in Table 1.

As apparent from Table 1, in the method of the present invention, in case an aqueous solution of sodium sulfate is used as a coagulating bath, the proper amount of thiourea to be mixed and contained in the polyurethane solution is in a range of 5 to 90% by weight, preferably 20 to 70% by weight or more preferably 30 to 60% by weight. It was recognized that, when a polyurethane solution mixed with thiourea in such range was used as a coating solution, a tough and soft uniformly microporous film high in the moisture-permeability was obtained.

TABLE 1

| Amount of thiourea (percent) (on polyurethane) | Moisture-permeability | Macro-pores in the film | Breaking strength (kg./mm.$^2$) | Breaking elongation (percent) |
|---|---|---|---|---|
| 0 (control) | 3.2 | Present | 0.96 | 540 |
| 3 (control) | 4.8 | do | 0.94 | 545 |
| 5 | 8.7 | Absent | 0.96 | 517 |
| 10 | 10.0 | do | 0.94 | 541 |
| 20 | 11.5 | do | 0.92 | 520 |
| 30 | 12.9 | do | 0.91 | 525 |
| 40 | 13.0 | do | 0.93 | 540 |
| 50 | 13.1 | do | 0.94 | 541 |
| 60 | 12.9 | do | 0.93 | 528 |
| 70 | 11.5 | do | 0.85 | 534 |
| 80 | 10.0 | do | 0.81 | 480 |
| 90 | 10.2 | do | 0.80 | 490 |
| 95 110 | The coating solution gelled and could not be applied. | | | |
| 50% urea (control) | 6.8 | Present | 0.92 | 565 |

EXAMPLE 2

A microporous film was obtained in the same manner as in Example 1 except that each coating solution prepared in Example 1 was applied to be of a thickness of 1 mm. onto a glass plate and was then immersed for 10 minutes in an aqueous solution (at 40° C.) containing 200 g./l. of sodium sulfate and 10 g./l. of thiourea. The results are shown in Table 2. For comparisons, the same procedure was repeated except that the coagulating bath contained 10 g./l. of urea instead of thiourea and the coating solution did not contain thiourea (Control-a), and the same procedure was repeated except that the coagulating bath contained 10 g./l. of urea instead of thiourea and the coating solution contained 50% by weight (based on the polyurethane) of urea instead of thiourea (Control-b). The results are also indicated in Table 2.

As apparent also from Table 2, in the method of the present invention, even in the case that an aqueous solution containing both sodium sulfate and thiourea is used for a coagulating solution, the proper amount of thiourea to be added to the coating solution is in a range of 5 to 90% by weight, preferably 20 to 70% by weight or more preferably 30 to 60% by weight. In such range, a tough uniformly microporous film high in the moisture-permeability is obtained. The effects are more remarkable in thiourea than in urea.

As apparent also from the results in Table 3, the proper concentration of sodium sulfate in the coagulating solution is in a range of 50 to 330 g./l., preferably 200 to 300 g./l. It was recognized that, when the coating solution layer was coagulated in a coagulating bath with a salt concentration in this range, a tough soft film high in the moisture-permeability and having a uniform microporous structure was obtained.

EXAMPLE 4

A microporous film was formed in the same manner as in Example 3 except that an aqueous solution containing 240 g./l. of sodium sulfate and thiourea of a concentration shown in Table 4 was used as a coagulating bath. The results are shown in Table 4.

TABLE 2

| Amount of thiourea (percent) (on polyurethane) | Moisture-permeability | Macropores in the film | Breaking strength (kg./mm.²) | Breaking elongation (percent) |
| --- | --- | --- | --- | --- |
| 0 (control) | 3.4 | Present | 0.94 | 545 |
| 3 (control) | 4.6 | do | 0.95 | 530 |
| 5 | 8.9 | Absent | 0.98 | 529 |
| 10 | 10.5 | do | 0.90 | 531 |
| 20 | 12.0 | do | 0.95 | 535 |
| 30 | 13.5 | do | 0.96 | 532 |
| 40 | 13.9 | do | 0.98 | 530 |
| 50 | 13.9 | do | 0.98 | 548 |
| 60 | 13.8 | do | 0.97 | 545 |
| 70 | 11.9 | do | 0.90 | 520 |
| 80 | 11.0 | do | 0.85 | 485 |
| 90 | 10.6 | do | 0.83 | 498 |
| 95 | \multicolumn{4}{l}{The coating solution gelled and could not be applied.} | | | |
| 100 | | | | |
| Control-a | 4.9 | Absent | 0.94 | 550 |
| Control-b | 6.0 | do | 0.92 | 560 |

TABLE 4

| Concentration of sodium sulfate in the coagulating bath (g./l.) | Moisture-permeability | Macropores in the film | Breaking strength (kg./mm.²) | Breaking elongation (percent) |
| --- | --- | --- | --- | --- |
| 0 | 12.5 | Absent | 0.98 | 53.5 |
| 1 | 12.6 | do | 0.97 | 52.5 |
| 2 | 13.8 | do | 0.96 | 53.6 |
| 5 | 13.8 | do | 0.97 | 53.5 |
| 10 | 13.5 | do | 0.98 | 54.0 |
| 30 | 13.8 | do | 0.96 | 54.5 |
| 50 | 13.9 | do | 0.97 | 53.6 |
| 70 | 13.9 | do | 0.95 | 54.0 |
| 100 | 12.5 | do | 0.97 | 54.5 |
| 130 | 12.0 | do | 0.96 | 53.0 |
| 150 | 12.0 | do | 0.95 | 52.8 |
| 160 | 9.5 | Present | 0.82 | 51.0 |

EXAMPLE 3

Into the N,N'-dimethyl formamide solution of the polyurethane prepared in Example 1, there was added and dissolved 40% by weight thiourea (based on the weight of the polyurethane contained in said solution) with stirring to prepare a coating solution. The coating solution was applied to be of a thickness of about 1 mm. onto a glass plate in the same manner as in Example 1. The coated glass plate was then left in an atmosphere of a relative humidity of 75% at 25° C. for 5 minutes and was then dipped in an aqueous solution of sodium sulfate in a predetermined concentration at 40° C. for 10 minutes. Then the glass plate with the coagulated film thereon was dipped into a hot water bath at 50° C. for washing. The film was peeled off the glass plate, was washed with hot water for 30 minutes and was air-dried at 100° C. for 30 minutes. The properties of the thus obtained films are shown in Table 3.

As apparent from the results in Table 4, the proper concentration of thiourea in the coagulating solution is in a range of 0 to 150 g./l., preferably 0 to 100 g./l. and most preferably 2 to 70 g./l., to obtain a tough soft uniform microporous film.

EXAMPLE 5

Each of an N,N'-dimethyl formamide solution containing 35% by weight of an ester type polyurethane (trademark Crysbon 7667, product of Japan Reichfold Co., Ltd.) and a solution prepared by adding and mixing 40% by weight thiourea (on the weight of the polyurethane) in this polyurethane solution was applied to be of a thickness of 1 mm. onto a glass plate. The coated glass plate was then left in an atmosphere of a relative humidity of 85% at a temperature of 20° C. for 3 minutes and was then dipped in an aqueous solution (coagulating bath) containing an inorganic salt of a predetermined concentration at 40° C. for 10 minutes. The glass plate with a coagulated film thereon was then dipped into a hot water bath at 50° C. for washing. The film was peeled off the glass plate, was washed with hot water for 30 minutes and was air-dried at 100° C. for 3 minutes. The properties of the obtained films are shown in Table 5.

As apparent from the results shown in Table 5, the properties of the produced films varies depending on the kind of the inorganic salt coexisting with thiourea in the coagulating bath and that only with the particular inorganic salts used in the present invention, a uniform microporous film high in the moisture-permeability can be produced. In case any other inorganic salt is used, a film having macropores is formed and its moisture-permeability is low.

TABLE 3

| Concentration of sodium sulfate in the coagulating bath (g./l.) | Moisture-permeability | Macropores in the film | Breaking strength (kg./mm.²) | Breaking elongation (percent) |
| --- | --- | --- | --- | --- |
| 0 | 4.8 | Present | 0.95 | 510 |
| 50 | 10.5 | Absent | 0.96 | 525 |
| 100 | 10.8 | do | 0.96 | 530 |
| 150 | 10.7 | do | 0.97 | 525 |
| 200 | 12.5 | do | 0.98 | 520 |
| 250 | 12.9 | do | 0.98 | 530 |
| 300 | 13.0 | do | 0.97 | 546 |
| 330 | 10.5 | do | 0.97 | 540 |
| 350 | \multicolumn{4}{l}{The salt crystallized out and the coagulating bath could not be used.} | | | |

TABLE 5

| Inorganic salt in the coagulating bath | Concentration of salt (g./l.) | Thiourea in the coating solution | Breaking strength (kg./mm.²) | Breaking elongation (percent) | Moisture permeability | Macropores in the film |
|---|---|---|---|---|---|---|
| Sodium chloride | 250 | Absent | 0.84 | 536 | 4.8 | Present. |
| Do | 250 | Present | 0.88 | 535 | 13.8 | Absent. |
| Sodium sulfate | 250 | Absent | 0.97 | 543 | 4.3 | Present. |
| Do | 250 | Present | 0.98 | 541 | 13.9 | Absent. |
| Aluminum chloride | 300 | Absent | 0.81 | 479 | 4.5 | Present. |
| Do | 300 | Present | 0.87 | 480 | 11.5 | Absent. |
| Aluminum sulfate | 200 | Absent | 0.76 | 375 | 4.3 | Present. |
| Do | 200 | Present | 0.76 | 378 | 12.0 | Absent. |
| Ammonium chloride | 300 | Absent | 0.99 | 517 | 4.5 | Present. |
| Do | 300 | Present | 0.99 | 518 | 11.0 | Absent. |
| Ammonium sulfate | 350 | Absent | 1.03 | 528 | 4.5 | Present. |
| Do | 350 | Present | 1.02 | 528 | 13.4 | Absent. |
| Magnesium chloride | 250 | Absent | 0.93 | 533 | 2.4 | Present. |
| Do | 250 | Present | 0.95 | 531 | 2.4 | Do. |
| Magnesium sulfate | 200 | Absent | 0.92 | 521 | 2.4 | Do. |
| Do | 200 | Present | 0.92 | 520 | 2.5 | Do. |
| Calcium chloride | 250 | Absent | 1.06 | 563 | 2.2 | Do. |
| Do | 250 | Present | 1.01 | 560 | 2.2 | Do. |
| Calcium nitrate | 250 | Absent | 0.92 | 535 | 2.4 | Do. |
| Do | 250 | Present | 0.93 | 530 | 2.3 | Do. |
| Potassium sulfate | 250 | Absent | 0.83 | 531 | 4.2 | Do. |
| Do | 250 | Present | 0.89 | 536 | 13.0 | Absent. |

EXAMPLE 6

Each of an N,N'-dimethyl formamide solution containing 30% by weight of an ester type polyurethane (trademark Paraplen-22, product of Hodogaya Kagaku K.K., Japan) and a solution prepared by adding and mixing 50% by weight thiourea (on the polyurethane) in the above polyurethane solution was applied to be of a thickness of 0.8 mm. onto the surface of a base fabric of a thickness of 0.8 mm. and a density of 0.51 high in the gas-permeability and made by setting 28 parts of a nonwoven fabric (consisting of nylon-6 fibers of 1.2 deniers and polyester fibers of 1.5 deniers) with 1.2 parts of a butadieneacrylonitrile copolymer. The coated material was left in an atmosphere of predetermined temperature and humidity conditions for 5 minutes and was then dipped in an aqueous solution (at 45° C.) containing 250 g./l. of sodium sulfate for 10 minutes. Then the material with a coagulated film thereon was well washed in a hot water bath at 50° C. and was then air-dried at 110° C. for 10 minutes.

Then an acrylate paint for leathers was sprayed to coat the surface of this microporous polyurethane film layer and was dried. Further, a nitrocellulose clear lacquer for leathers was sprayed on the surface for finishing. Each of the thus obtained products is soft and lustrous, just as tough as a natural leather. It is excellent as a synthetic leather in the moisture-permeability and strength as shown in Table 6 and has a structure in which a uniform microporous film having no macropores is strongly bonded and laminated on the base fabric.

For comparison the same procedure was repeated except that the coating solution contained 50% by weight of urea instead of thiourea. The result is indicated at the end of Table 6.

TABLE 6

| Thiourea in the coating solution | Atmosphere | | Bending strength | Moisture permeability | Macropores in the film |
|---|---|---|---|---|---|
| | Temperature (° C.) | Relative humidity (percent) | | | |
| Absent | 22 | 52 | Not broken with 200,000 times of bending. | 3.9 | Absent. |
| Present | 22 | 52 | do | 8.1 | Do. |
| Absent | 27 | 77 | do | 4.1 | Present. |
| Present | 27 | 77 | do | 8.1 | Absent. |
| Absent | 28 | 85 | do | 3.8 | Present. |
| Present | 28 | 85 | do | 8.0 | Absent. |
| Absent | 25 | 93 | do | 4.1 | Present. |
| Present | 25 | 93 | do | 8.0 | Absent. |
| Absent | 35 | 83 | do | 3.9 | Present. |
| Present | 35 | 83 | do | 8.1 | Absent. |
| Urea | 28 | 85 | do | 3.9 | Present. |

EXAMPLE 7

A synthetic leather was prepared in the same manner as in Example 6 except that an aqueous solution containing 250 g./l. of sodium sulfate and 10 g./l. of thiourea was used as a coagulating solution instead of the aqueous solution of sodium sulfate. The results are shown in Table 7.

The synthetic leather obtained under the conditions of this invention was soft and lustrous, had a touch like that of a natural leather and was high in the moisture-permeability and bending strength.

TABLE 7

| Thiourea in the coating solution | Atmosphere | | Bending strength | Moisture permeability | Macropores in the film |
|---|---|---|---|---|---|
| | Temperature (° C.) | Relative humidity (percent) | | | |
| Absent | 25 | 53 | Not broken with 200,000 times of bending. | 3.8 | Absent. |
| Present | 25 | 53 | do | 9.9 | Do. |
| Absent | 27 | 75 | do | 3.2 | Present. |
| Present | 27 | 75 | do | 9.8 | Absent. |
| Absent | 28 | 86 | do | 4.0 | Present. |
| Present | 28 | 86 | do | 9.8 | Absent. |
| Absent | 26 | 93 | do | 3.8 | Present. |
| Present | 26 | 93 | do | 9.6 | Absent. |
| Absent | 35 | 83 | do | 3.9 | Present. |
| Present | 35 | 83 | do | 9.9 | Absent. |
| Control-W | 28 | 86 | do | 4.5 | Present. |

NOTE.—Control-W: 50% urea (instead of thiourea) was added to the coating solution, and thiourea was replaced by urea in the coagulating bath.

EXAMPLE 8

Each of a solution prepared by adding and mixing 45% by weight thiourea in an N,N'-dimethyl formamide solution containing 25% of an ester type polyurethane (trademark Paraplene-22, product of Hodogaya Kagaku K.K., Japan) and a solution prepared by adding and mixing 15% by weight polyvinyl chloride (on the weight of the polyurethane) and 35% by weight thiourea in the above mentioned polyurethane solution was applied to be of a thickness of 0.8 mm. onto a mix-spun broad fabric (#120) of polyester fibers and cotton. The coated material was left in an atmosphere of a relative humidity of 85% at 25° C. for 5 minutes and was dipped in an aqueous solution (40° C.) containing 250 g./l. of sodium sulfate for 10 minutes. Then it was well washed with water and air-dried at 110° C. for 10 minutes. The thus obtained synthetic leather had a structure in which a uniform microporous film was laminated and bonded on said base fabric, a natural leathery touch and a high moisture-permeability. Its performances are shown in Table 8.

For comparison, Control A in which the above mentioned polyurethane solution was used as a coating solution and water was used for the coagulating bath, Control B in which an aqueous solution containing 250 g./l. of sodium sulfate was used for the coagulating bath and Control C in which a solution prepared by adding and mixing 25% by weight urea in the above mentioned polyurethane solution was used as a coating solution and an aqueous solution containing 250 g./l. of sodium sulfate was used for the coagulating bath were also indicated in Table 8. These control samples were made under the same conditions as were mentioned above.

TABLE 8

| Polymer in the coating solution | Bending strength | Moisture-permeability | Macropores in the formed film. |
|---|---|---|---|
| Polyurethane | Not broken with 200,000 times of bending. | 8.5 | Absent. |
| Polyvinyl chloride and polyurethane. | do | 8.5 | Do. |
| Polyacrylic acid and polyurethane. | do | 8.4 | Do. |
| Control A | do | 2.0 | Present. |
| Control B | do | 3.5 | Do. |
| Control C | do | 4.5 | Do. |

As apparent from the results in Table 8, when thiourea is contained in the coating solution and an aqueous solution of sodium sulfate is used for the coagulating solution, the effect of the present invention is remarkable.

EXAMPLE 9

The same procedure as in Example 8 was repeated except that an aqueous solution containing 250 g./l. of sodium sulfate and 40 g./l. of thiourea was used for the coagulating bath.

The results are shown in Table 9. By the way, Controls A, B and C mentioned in Table 9 are the same as in Example 8.

TABLE 9

| Polymer in the coating solution | Bending strength | Moisture-permeability | Macropores in the laminated formed film. |
|---|---|---|---|
| Polyurethane (present invention). | Not broken with 200,000 times of bending. | 9.8 | Absent. |
| Polyurethane and polyvinyl chloride (present invention). | do | 9.6 | Do. |
| Polyurethane and polyacrylic acid (present invention). | do | 9.7 | Do. |
| Control A | do | 2.0 | Present. |
| Control B | do | 3.5 | Do. |
| Control C | do | 4.5 | Do. |

As apparent also from the results in Table 9, when thiourea is contained in the coating solution and an aqueous solution containing sodium sulfate and thiourea is used for the coagulating bath, the effect of the present invention is remarkable.

As evident also from the results of the above indicated various examples, according to the method of the present invention, even if a filmy coated solution layer is exposed under any temperature and humidity conditions, no macropore is produced in the coagulated film and a tough soft porous film high in the moisture-permeability and having uniform micropores is obtained.

What we claim is:

1. A method for making a sheet material having a high moisture permeability and a uniform microporous structure, which comprises the steps of:
    (1) coating a base material with a coating solution of film-forming synthetic polymer consisting essentially of polyurethane dissolved in water-miscible organic solvent, said coating solution containing from 5% to 90% by weight of thiourea, based on the weight of polyurethane in the coating solution;
    (2) treating the coated base material with an aqueous coagulating liquid to coagulate the polymer layer, said aqueous coagulating liquid containing
        (a) from 50 to 450 g./l. of inorganic salt selected from the group consisting of sodium chloride, potassium chloride, aluminum chloride, ammonium chloride, ammonium sulfate, sodium sulfate, potassium sulfate and aluminum sulfate, the concentration of said salt in said coagulating liquid being effective to form a uniform microporous structure in said polymer layer without precipitating said inorganic salt, and
        (b) from 0 to 150 g./l. of thiourea, and then
    (3) washing and drying the polymer layer.

2. A method as claimed in claim 1 wherein the amount of thiourea in the coating solution is 20–70% by weight based on the polyurethane present in the coating solution.

3. A method as claimed in claim 1 wherein the coagulating liquid contains thiourea in an amount of from 2 to 70 g./l.

4. A method as claimed in claim 1 wherein the concentration of the polymer in the coating solution is 10–40% by weight.

5. A method as claimed in claim 1 wherein the coating solution additionally contains 2–40% by weight, based on the polyurethane, of other film-forming vinyl polymer or copolymer.

6. A method as claimed in claim 1 wherein the temperature of the coagulating liquid is 30–60° C.

References Cited

UNITED STATES PATENTS 3,526,531    9/1970    Asano et al. _____ 117—161 KP
2,466,457    4/1959    Lynn et al. _____ 117—141

WILLIAM D. MARTIN, Primary Examiner
T. G. DAVIS, Assistant Examiner

U.S. Cl. X.R.
117—135.5, 155 R, 161 KP, 73, 76 T, 76 P